US012628738B2

(12) United States Patent
Finley et al.

(10) Patent No.: US 12,628,738 B2
(45) Date of Patent: May 19, 2026

(54) SYSTEM AND METHOD FOR DETERMINING CROP POPULATION WITHIN A FIELD DURING A HARVESTING OPERATION BEING PERFORMED BY AN AGRICULTURAL HARVESTER

(71) Applicant: CNH Industrial America LLC, New Holland, PA (US)

(72) Inventors: Bryan Finley, Bettendorf, IA (US); Tyler Romoser, Keota, IA (US)

(73) Assignee: CNH Industrial America LLC, New Holland, PA (US)

( * ) Notice: Subject to any disclaimer, the term of this patent is extended or adjusted under 35 U.S.C. 154(b) by 693 days.

(21) Appl. No.: 17/978,539

(22) Filed: Nov. 1, 2022

(65) Prior Publication Data

US 2024/0138296 A1 May 2, 2024

(51) Int. Cl.
*A01D 41/127* (2006.01)
*A01B 79/00* (2006.01)
*A01B 79/02* (2006.01)

(52) U.S. Cl.
CPC ........ *A01D 41/1271* (2013.01); *A01B 79/005* (2013.01); *A01B 79/02* (2013.01)

(58) Field of Classification Search
CPC ................................................ A01D 41/1271
See application file for complete search history.

(56) References Cited

U.S. PATENT DOCUMENTS

| | | | |
|---|---|---|---|
| 6,073,427 A | 6/2000 | Nichols | |
| 9,481,294 B2 | 11/2016 | Sauder et al. | |

| | | | |
|---|---|---|---|
| 9,578,808 B2 | 2/2017 | Dybro et al. | |
| 10,091,932 B2 | 10/2018 | Neitemeier et al. | |
| 10,537,060 B2 | 1/2020 | Sauder et al. | |
| 11,889,788 B2 * | 2/2024 | Vandike | G01L 23/00 |
| 2014/0338298 A1 * | 11/2014 | Jung | A01D 41/127 56/10.2 R |
| 2015/0293068 A1 * | 10/2015 | Acheson | A01D 41/127 702/170 |

(Continued)

FOREIGN PATENT DOCUMENTS

EP          3284334 B1     4/2019

OTHER PUBLICATIONS

Extended European Search Report for EP Application No. 23207011.0 dated Apr. 4, 2024 (12 pages).

*Primary Examiner* — Claude J Brown
(74) *Attorney, Agent, or Firm* — Dority & Manning, P.A.

(57) ABSTRACT

An agricultural harvester includes a feeder configured to convey harvested material from a harvesting implement to a threshing and separating assembly. Furthermore, the agricultural harvester includes an imaging device positioned within feeder, with the imaging device configured to generate image data depicting the harvested material entering or being conveyed through the feeder during the harvesting operation. Additionally, the agricultural harvester includes a computing system communicatively coupled to the imaging device. In this respect, the computing system is configured to analyze the generated image data to identify crop ears present within the harvested material entering or being conveyed through the feeder. Moreover, the computing system is configured to determine the crop population within at least a portion of the field based on the identified crop ears present within the harvested material.

18 Claims, 6 Drawing Sheets

(56)                        References Cited

U.S. PATENT DOCUMENTS

| 2015/0327440 | A1* | 11/2015 | Dybro .................... | A01D 75/00 |
| | | | | 73/862.541 |
| 2017/0118914 | A1 | 5/2017 | Bruns et al. | |
| 2021/0076569 | A1 | 3/2021 | Blank | |
| 2022/0110238 | A1* | 4/2022 | Vandike ............... | A01D 41/141 |
| 2022/0132737 | A1 | 5/2022 | Anderson et al. | |

* cited by examiner

200

202 — Receive image data

204 — Identify crop ears present within the harvested material

206 — Determine crop population

208 — Acess planting data

210 — Determine difference between crop population and number of seeds

212 — Determine yield-based parameter

214 — Generate field map

216 — Initiate notification to operator

218 — Control ground speed

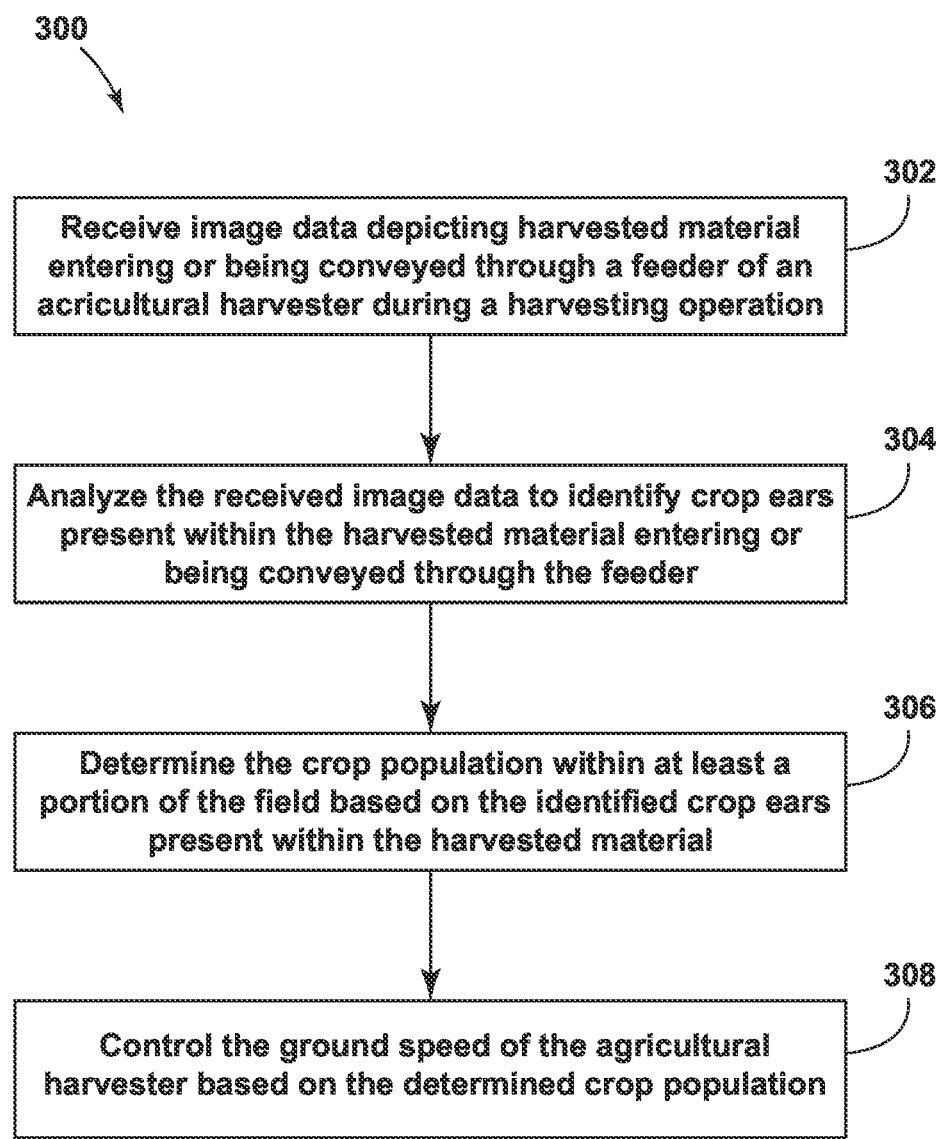

300

302

Receive image data depicting harvested material entering or being conveyed through a feeder of an agricultural harvester during a harvesting operation

304

Analyze the received image data to identify crop ears present within the harvested material entering or being conveyed through the feeder

306

Determine the crop population within at least a portion of the field based on the identified crop ears present within the harvested material

308

Control the ground speed of the agricultural harvester based on the determined crop population

FIG. 6

SYSTEM AND METHOD FOR DETERMINING CROP POPULATION WITHIN A FIELD DURING A HARVESTING OPERATION BEING PERFORMED BY AN AGRICULTURAL HARVESTER

FIELD OF THE INVENTION

The present disclosure generally relates to agricultural harvesters and, more particularly, to systems and methods for determining crop population within a field during a harvesting operation being performed by an agricultural harvester.

BACKGROUND OF THE INVENTION

A harvester is an agricultural machine used to harvest and process crops. For example, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

Modern harvesters are generally able to accurately monitor various parameters associated with the crops being harvested. For example, modern harvesters can determine the yield of the field per unit area (e.g., per acre or hectare). However, such harvesters are unable to quantify the crop population or the number of crop plants within the field. The crop population at the time of harvest would be helpful in determining the effectiveness of the previous planting operation.

Accordingly, a system and method for determining crop population within a field during a harvesting operation being performed by an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural harvester. The agricultural harvester includes a frame, a threshing and separating assembly supported on the frame, and a feeder adjustably coupled to the frame, with the feeder configured to convey harvested material from a harvesting implement to the threshing and separating assembly. Furthermore, the agricultural harvester includes an imaging device positioned within feeder, with the imaging device configured to generate image data depicting the harvested material entering or being conveyed through the feeder during the harvesting operation. Additionally, the agricultural harvester includes a computing system communicatively coupled to the imaging device. In this respect, the computing system is configured to analyze the generated image data to identify crop ears present within the harvested material entering or being conveyed through the feeder. Moreover, the computing system is configured to determine the crop population within at least a portion of the field based on the identified crop ears present within the harvested material.

In another aspect, the present subject matter is directed to a system for determining crop population within a field during a harvesting operation being performed by an agricultural harvester. The system includes a feeder configured to convey harvested material from a harvesting implement of the agricultural harvester to a threshing and separating assembly of the agricultural harvester. In addition, the system includes an imaging device configured to generate image data depicting the harvested material entering or being conveyed through the feeder during the harvesting operation. Furthermore, the system includes a computing system communicatively coupled to the imaging device. As such, the computing system is configured to analyze the generated image data to identify crop ears present within the harvested material entering or being conveyed through the feeder. Additionally, the computing system is configured to determine the crop population within at least a portion of the field based on the identified crop ears present within the harvested material.

In a further aspect, the present subject matter is directed to a method for determining crop population within a field during a harvesting operation being performed by an agricultural harvester. The agricultural harvester, in turn, includes a feeder configured to convey harvested material from a harvesting implement of the agricultural harvester to a threshing and separating assembly of the agricultural harvester. The method includes receiving, with a computing system, image data depicting the harvested material entering or being conveyed through the feeder during the harvesting operation. Moreover, the method includes analyzing, with the computing system, the received image data to identify crop ears present within the harvested material entering or being conveyed through the feeder. In addition, the method includes determining, with computing system, the crop population within at least a portion of the field based on the identified crop ears present within the harvested material. Furthermore, the method includes controlling, with computing system, a ground speed of the agricultural harvester based on the determined crop population.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 6 illustrates a flow diagram of one embodiment of a method for determining crop population within a field during a harvesting operation being performed by an agricultural harvester in accordance with aspects of the present subject matter.

Figure 1:
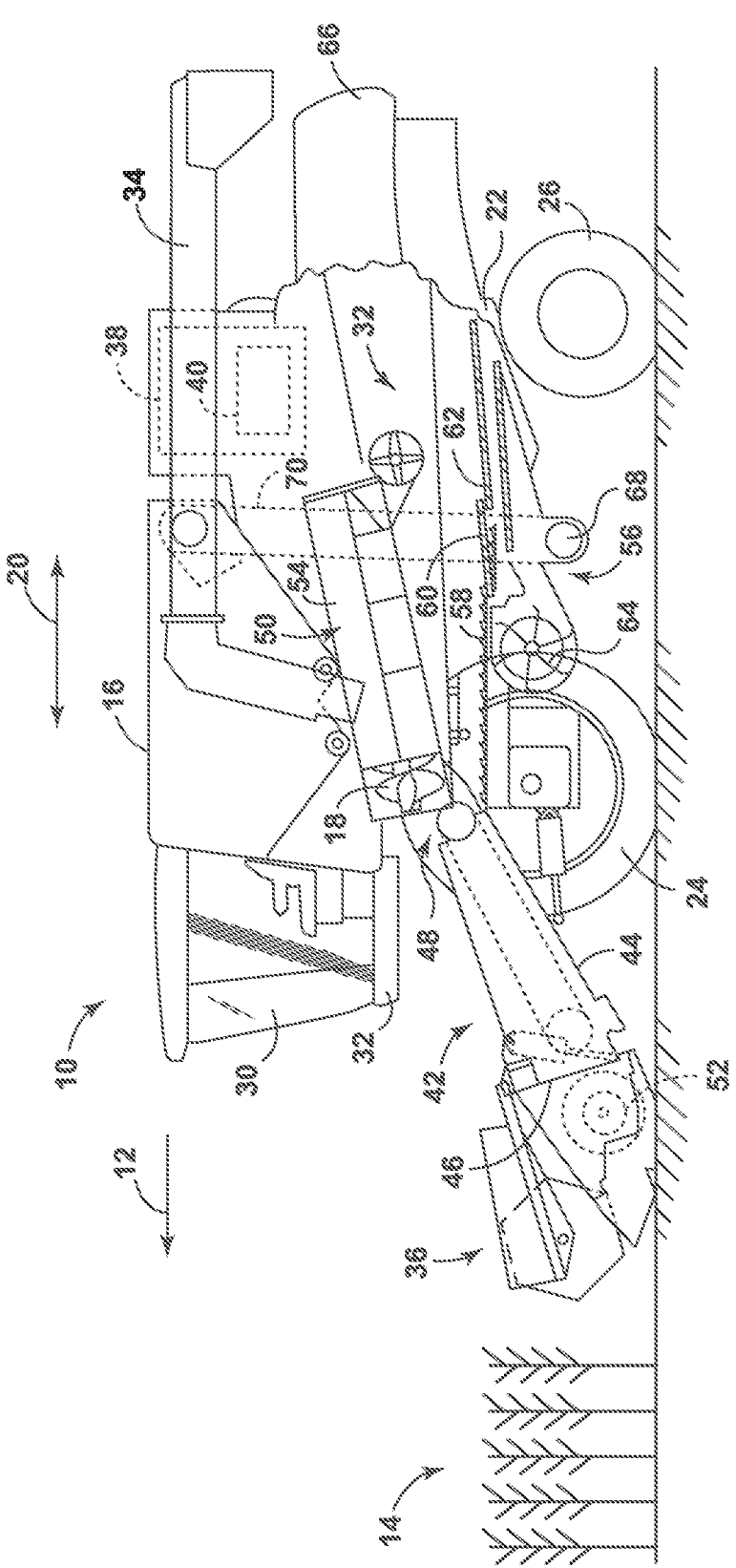
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for determining crop population within a field during a harvesting operation being performed by an agricultural harvester. As will be described below, the agricultural harvester includes a feeder configured to convey harvested material from a harvesting implement of the harvester to a threshing and separating assembly of the harvester. Furthermore, the agricultural harvester includes an imaging device (e.g., a camera) configured to generate image data depicting the harvested material entering or being conveyed through the feeder during the harvesting operation.

In several embodiments, a computing system of the disclosed system is configured to determine the crop population based on the image data generated by the imaging device. Specifically, the computing system is configured to analyze the image data to identify crop ears (e.g., corn ears) present within the harvested material entering or being conveyed through the feeder. Moreover, the computing system is configured to determine the number of the identified crop ears, with this number corresponding to the crop population. Thereafter, in some embodiments, the computing system may control the ground speed of the agricultural harvester based on the determined crop population, e.g., to maintain harvesting efficiency.

Using the number of crop ears identified in image data depicting the harvested material entering or being conveyed through the feeder provides an accurate determination the crop population of a field at the time of harvest without consuming significant computing resources. More specifically, determining the number of crop plants within a field based on counting the stalks entering the harvesting implement can be difficult. For example, it can be computationally difficult and expensive to identify individual stalks due to movement of the harvesting implement and the presence of leaves and debris. However, it is much less computationally intensive to identify the crop ears within the harvested material entering or being conveyed through the feeder due to differences in the appearance of the crop ears and the remaining harvested material. Moreover, most individual crop plants (e.g., corn) produce only a single ear. Thus, by identifying and determining the number crop ears entering or being conveyed through the feeder, the crop population of the field can be accurately determined without consuming significant computing resources.

Referring now to the drawings, FIG. 1 illustrates a partial sectional side view of the agricultural harvester 10. In general, the harvester 10 is configured to travel across a field in a forward direction of travel (indicated by arrow 12) to harvest a standing crop 14 present within the field. While traversing the field, the harvester 10 is configured to process the harvested material and store the grain, seed, or the like within a crop tank 16 of the harvester 10.

In the illustrated embodiment, the harvester 10 is configured as an axial-flow type combine in which the harvested crop material is threshed and separated while being advanced by and along a rotor 18 extending in an axial direction 20. However, in alternative embodiments, the harvester 10 may have any other suitable harvester configuration, such as a traverse-flow type configuration in which the rotor extends in a lateral direction.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the chassis 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and a crop unloading tube 34 supported by the chassis 22. As will be described below, the crop processing system 32 may be configured to perform various processing operations on the harvested material as the crop processing system 32 transfers the harvested material from a harvesting implement 36 (e.g., a header) of the harvester 10 and through the harvester 10. Moreover, the harvester 10 may include an engine 38 and a transmission 40 mounted on the chassis 22. The transmission 40 may be operably coupled to the engine 38 and may provide variably adjusted gear ratios for transferring engine power to the wheels 24 via a drive axle assembly (or via axles if multiple drive axles are employed).

Additionally, as shown in FIG. 1, the harvester 10 includes a feeder 42 that couples to and supports the harvesting implement 36. More specifically, the feeder 42 may include a feeder housing 44 extending from a forward end 46 to an aft end 48. The forward end 46 of the feeder housing 44 may, in turn, be coupled to harvesting implement 36. Moreover, the aft end 48 of the feeder housing 44 may be pivotably coupled to the chassis 22 adjacent to a threshing and separating assembly 50 of the crop processing system 32. Such a pivotable coupling may permit movement of the harvesting implement 36 relative to the field surface in the vertical direction.

As the harvester 10 is propelled in the forward direction of travel 12 over the field with the standing crop 14, the material is severed from the stubble by a cutter bar (not shown) positioned at the front of the harvesting implement 36. The harvested material is delivered by a header conveyance device 52 (e.g., an auger, belt, chain, etc.) to the forward end 46 of the feeder housing 44, which supplies the harvested crop material to the threshing and separating assembly 50. In general, the threshing and separating assembly 50 may include a cylindrical chamber 54 in which the rotor 18 is rotated to thresh and separate the harvested material received therein. That is, the harvested material is rubbed and beaten between the rotor 18 and the inner surfaces of the chamber 54 to loosen and separate the grain, seed, or the like from the straw.

The material separated by the threshing and separating assembly 50 may fall onto a cleaning assembly 56 of the crop processing system 32. As will be described below, the cleaning assembly 56 may include a series of oscillating components, such as one or more pans 58, pre-sieves 60, and/or sieves 62, that are configured to oscillate relative to the frame 22. As such, the separated material may be spread out via the oscillation of such components 58, 60, 62 and the grain, seeds, or the like may eventually fall through apertures defined by the sieve(s) 62. Additionally, a cleaning fan 64 may be positioned adjacent to one or more of the pre-sieve(s) 60 and the sieve(s) 62 to provide an air flow through that removes chaff and other impurities from the material present thereon. The impurities may be discharged from the harvester 10 through the outlet of a straw hood 66 positioned at the aft end of the harvester 10. The cleaned harvested crop passing through the sieve(s) 62 may then fall into a trough of an auger 68, which may transfer the harvested crop to an elevator 70 for delivery to the crop tank 16.

The configuration of the agricultural harvester 10 described above and shown in FIG. 1 is provided only to place the present subject matter in an exemplary field of use. Thus, the present subject matter may be readily adaptable to any manner of agricultural harvester configuration.

Figure 2:
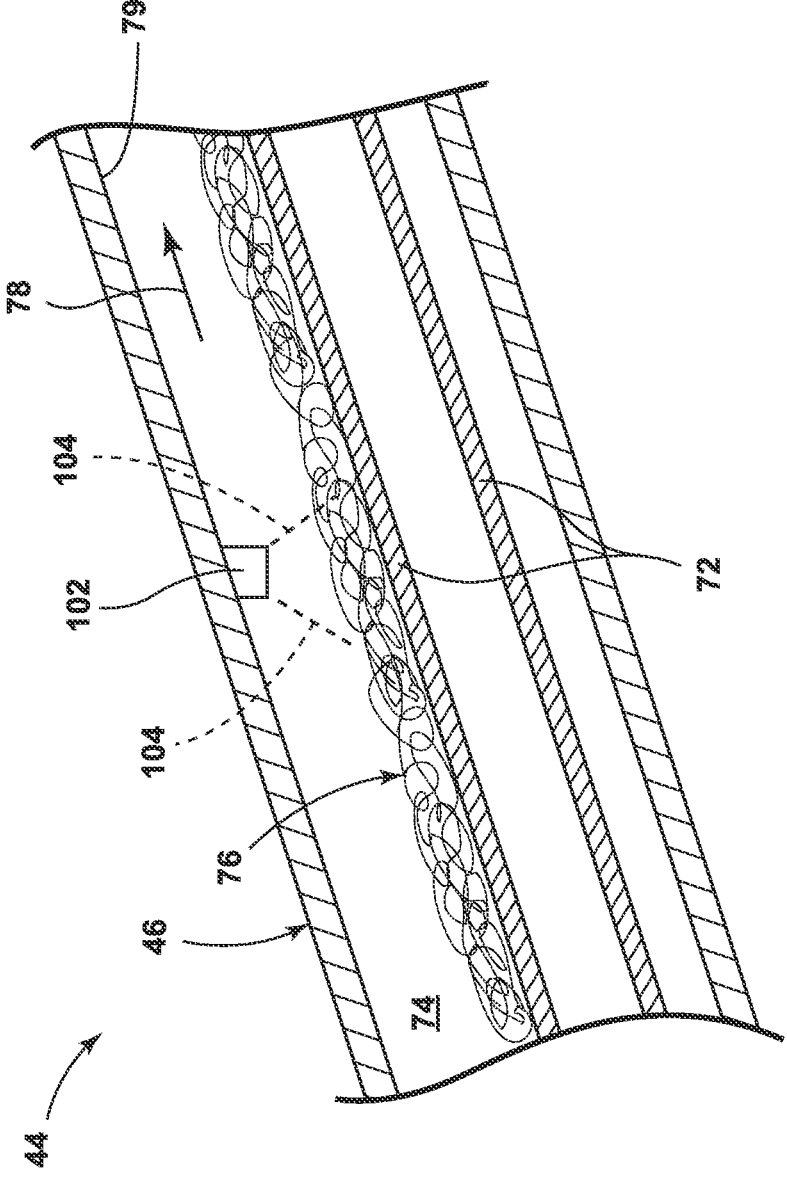
FIG. 2 illustrates a cross-sectional side view of one embodiment of a feeder of an agricultural harvester in accordance with aspects of the present subject matter.

FIG. 2 illustrates a cross-section view of the feeder 42. Specifically, in several embodiments, the feeder 42 includes a conveyor 72 positioned within the feeder housing 44. In this respect, the feeder housing 44 and the conveyor 72 define a feeder passage 74 therebetween that extends from the first end 46 (FIG. 1) of the feeder 42 to the second end 48 (FIG. 1) of the feeder 42. As such, the conveyor 72 is configured to convey harvested material 76 received from the harvesting implement 36 (FIG. 1) through the feeder passage 74 to the threshing and separating assembly 50 (FIG. 1) as indicated by arrow 78.

As shown in FIG. 2, in several embodiments, an imaging device 102 is positioned within the feeder 42. Specifically, as shown, the imaging device 102 has a field of view (e.g., as indicated by dashed lines 104) directed at the harvested material 76 being conveying through the feeder 42. In this respect, the imaging devices 102 is configured to capture images or other image data depicting harvested material 76 being conveying through the feeder 42 during harvesting operations. As will be described below, a computing system may be configured to analyze the captured images to identify the crop ears (e.g., corn ears) present within the harvested material. Thereafter, the computing system may determine the crop population within the field based on the identified crop ears.

In general, the imaging device 102 may correspond to any suitable device(s) configured to capture images or other image data depicting the harvested material 76 being conveying through the feeder 42, such as a camera. For example, in one embodiment, the imaging device 102 may correspond to a camera, such as a stereographic camera configured to capture three-dimensional images of the harvested material on the conveyor 72. In other embodiments, the imaging device(s) 102 may correspond to a monocular camera(s) configured to capture two-dimensional images of the harvested material within its field of view.

In the illustrated embodiment, the imaging device 102 is mounted on an inner surface 79 of the feeder housing 44 such that the field of view 104 of the imaging device 102 is directed at a portion of the harvested material present on the conveyor 72. However, in alternative embodiments, the imaging device 102 may be installed at any other suitable location that allows the imaging device 102 to capture image data depicting the harvested material being conveyed by the feeder 42.

Figure 3:
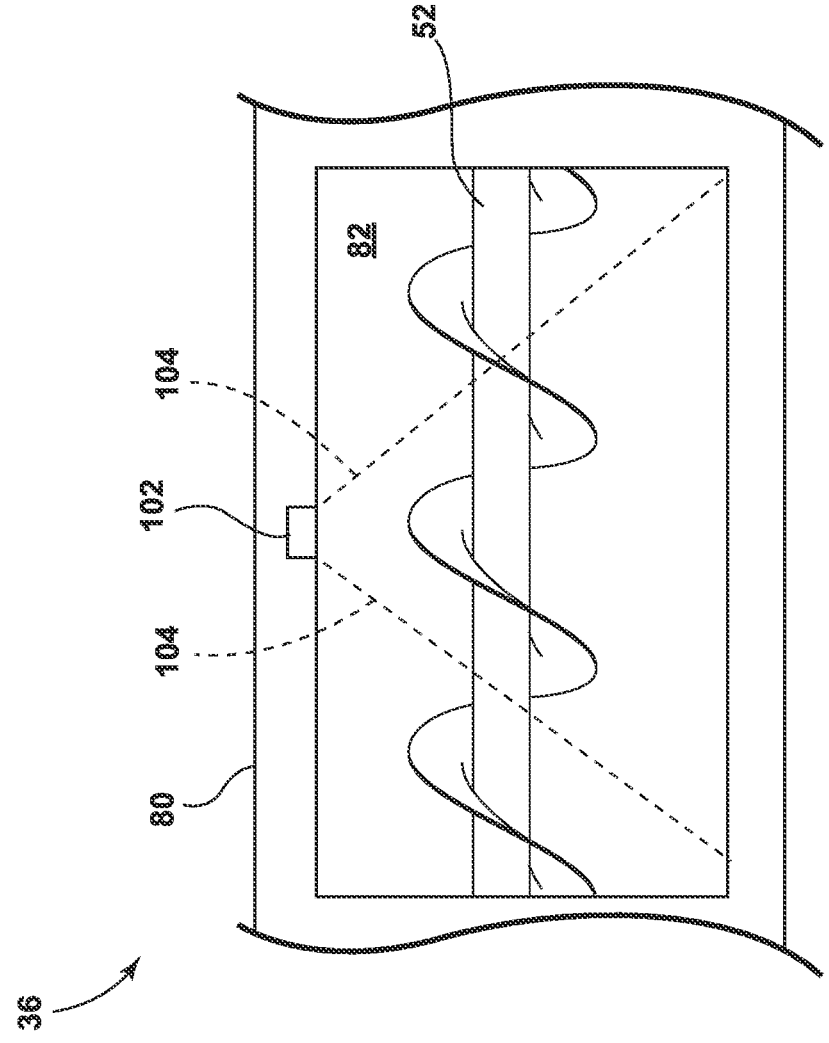
FIG. 3 illustrates a rear view of one embodiment of a harvesting implement of an agricultural harvester in accordance with aspects of the present subject matter.

Referring to FIG. 3, in other embodiments, the imaging device 102 may be positioned on the harvesting implement 36. More specifically, as shown, the harvesting implement 36 includes an implement frame 80 defining a feeder opening 82. In this respect, the during harvesting operations, the material severed by the cutter bar (not shown) is gathered and conveyed to the feeder opening 82 by the header conveyance device 52. The harvested material exits the harvesting implement 36 via the feeder opening and enters the first end 46 (FIG. 1) of the feeder 42. As such, in some embodiments, the imaging device 102 may be mounted on the implement frame 80 such that its field of view 104 is directed at the feeder opening 82. Thus, the imaging devices 102 is configured to capture images or other image data depicting harvested material 76 entering the feeder 42 during harvesting operations.

However, in alternative embodiments, the imaging device 102 may be installed at any suitable location that allows the imaging device 102 to capture images depicting the harvested material 76 entering or being conveying through the feeder 42.

Additionally, although the agricultural harvester 10 and the associated system and method disclosed herein are described in the context of a single imaging device 102, any suitable number of imaging devices 102 may be installed on the harvester 10.

Figure 4:
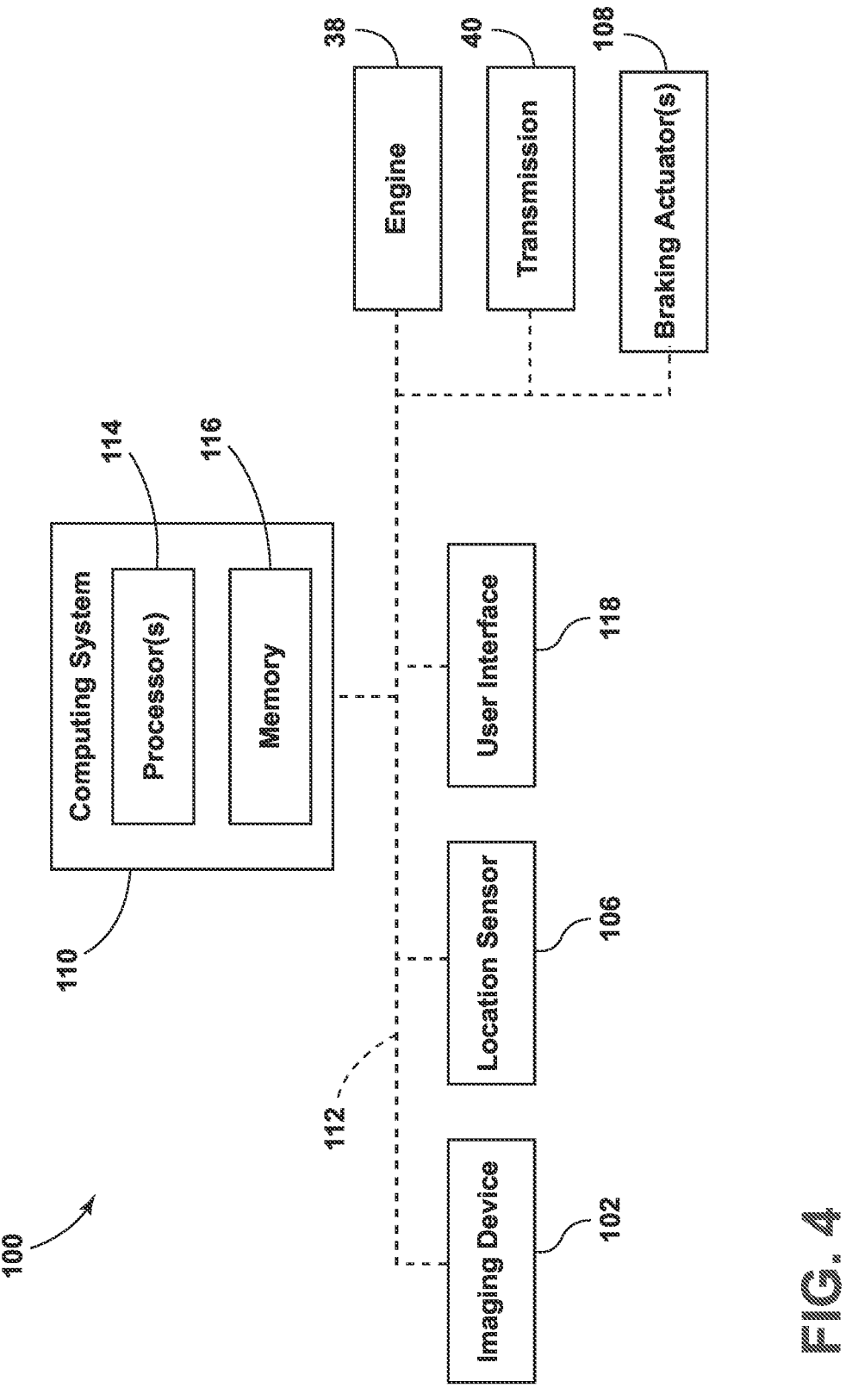
FIG. 4 illustrates a schematic view of one embodiment of a system for determining crop population within a field during a harvesting operation being performed by an agricultural harvester in accordance with aspects of the present subject matter.

Referring now to FIG. 4, a schematic view of one embodiment of a system 100 for determining crop population within a field during a harvesting operation being performed by an agricultural harvester is illustrated in accordance with aspects of the present subject matter. In general, the system 100 will be described herein with reference to the agricultural harvester 10 described above with reference to FIGS. 1-3. However, it should be appreciated by those of ordinary skill in the art that the disclosed system 100 may generally be utilized with agricultural harvesters having any other suitable harvester configuration.

As shown in FIG. 4, the system 100 includes a location sensor 106 may be provided in operative association with the agricultural harvester 10. In general, the location sensor 106 may be configured to determine or otherwise capture location data indicative of the current location of the agricultural harvester 10 within the field using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 106 may be transmitted to a computing system of the agricultural harvester 10 (e.g., in the form coordinates) and stored within the computing system's memory for subsequent processing and/or analysis. For instance, the determined location from the location sensor 106 may be used to geo-locate the agricultural harvester 10 within the field.

In addition, the system 100 may include one or more braking actuators 108 of the agricultural harvester 10. In general, when activated, the braking actuator(s) 108 may reduce the speed at which the agricultural harvester 10 moves across the field, such as by converting energy associated with the movement of the agricultural harvester 10 into heat. For example, in one embodiment, the braking actuator(s) 108 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the agricultural harvester 10 may any other suitable hydraulic, pneumatic, mechanical, and/or electrical component(s) configured to convert the rotation of the rotating element(s) into heat.

Moreover, the system 100 includes a computing system 110 communicatively coupled to one or more components of the agricultural harvester 10 and/or the system 100 to allow the operation of such components to be electronically or automatically controlled by the computing system 110. For instance, the computing system 110 may be communicatively coupled to the imaging device 102 via a communicative link 112. As such, the computing system 110 may be configured to receive image data from the imaging device 102 depicting the harvested material entering or being conveyed through the feeder 42. Furthermore, the computing system 110 may be communicatively coupled to the location sensor 106 via the communicative link 112. In this respect, the computing system 110 may be configured to receive location data from the imaging device 102 that is indicative of the current location of the agricultural harvester 10 within the field. Additionally, the computing system 110 may be communicatively coupled to the engine 38, the transmission 40, and/or the braking actuator(s) 108 via the communicative link 112. In this respect, the computing system 110 may be configured to control the operation of the engine 38, the transmission 40, and/or the braking actuator(s) 108 to adjust the ground speed of the agricultural harvester 10. In addition, the computing system 110 may be communicatively coupled to any other suitable components of the agricultural harvester 10 and/or the system 100.

In general, the computing system 110 may comprise one or more processor-based devices, such as a given controller or computing device or any suitable combination of controllers or computing devices. Thus, in several embodiments, the computing system 110 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 116 of the computing system 110 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 116 may generally be configured to store suitable computer-readable instructions that, when implemented by the processor(s) 114, configure the computing system 110 to perform various computer-implemented functions, such as one or more aspects of the methods and algorithms that will be described herein. In addition, the computing system 110 may also include various other suitable components, such as a communications circuit or module, one or more input/output channels, a data/control bus and/or the like.

The various functions of the computing system 110 may be performed by a single processor-based device or may be distributed across any number of processor-based devices, in which instance such devices may be considered to form part of the computing system 110. For instance, the functions of the computing system 110 may be distributed across multiple application-specific controllers or computing devices, such as a navigation controller, an engine controller, a transmission controller, a harvesting implement controller, and/or the like.

In addition, the system 100 may also include a user interface 118. More specifically, the user interface 118 may be configured to provide feedback from the computing system 110 (e.g., feedback associated with the determined crop population) to the operator. As such, the user interface 118 may include one or more feedback devices (not shown), such as display screens, speakers, warning lights, and/or the like, which are configured to provide feedback from the computing system 110 to the operator. As such, the user interface 118 may, in turn, be communicatively coupled to the computing system 110 via the communicative link 112 to permit the feedback to be transmitted from the computing system 110 to the user interface 118. Furthermore, some embodiments of the user interface 118 may include one or more input devices, such as touchscreens, keypads, touchpads, knobs, buttons, sliders, switches, mice, microphones, and/or the like, which are configured to receive inputs from the operator. In one embodiment, the user interface 118 may be mounted or otherwise positioned within the operator's cab 30 of the agricultural harvester 10. However, in alternative embodiments, the user interface 118 may mounted at any other suitable location.

Figure 5:
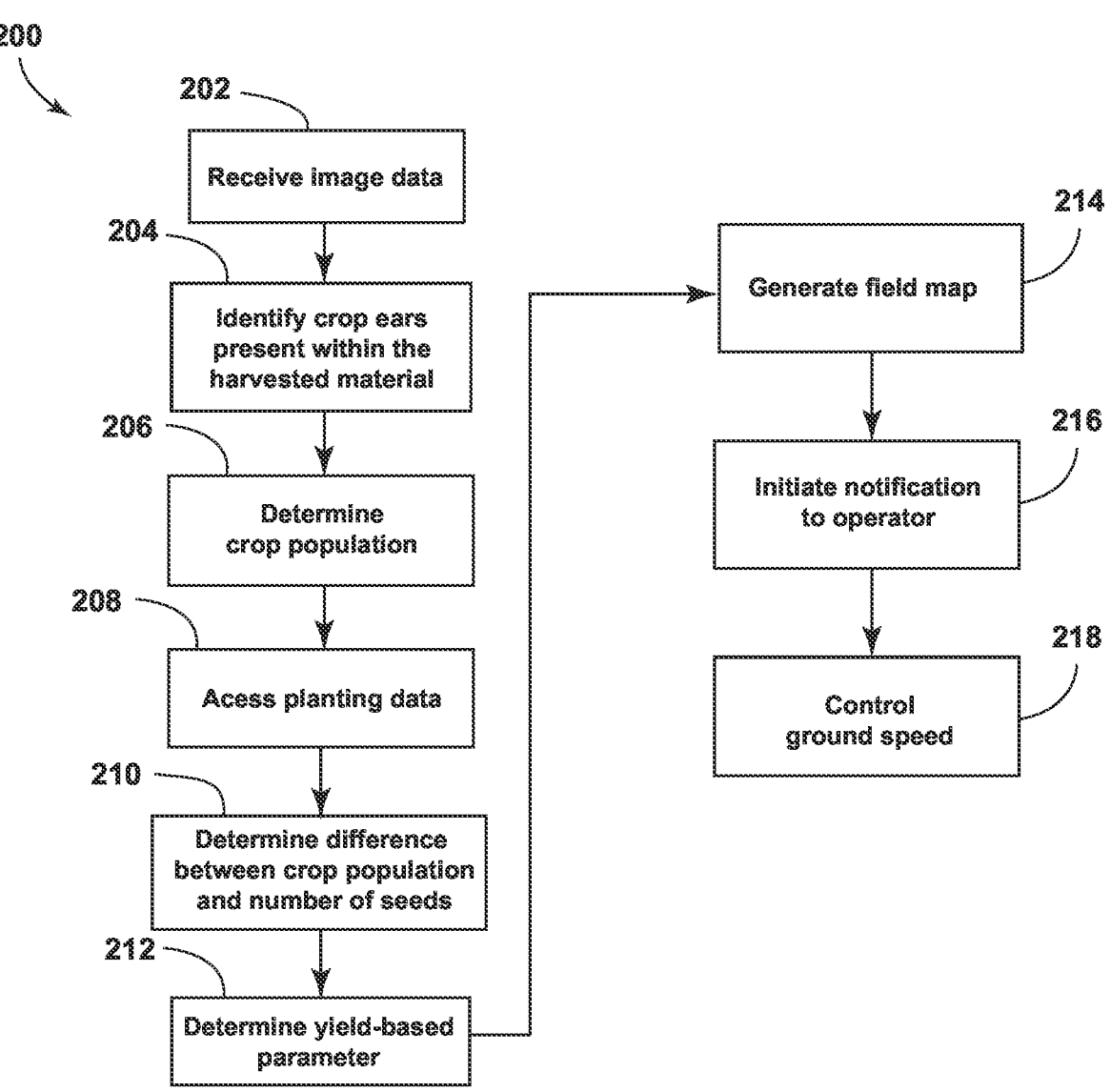
FIG. 5 illustrates a flow diagram providing one embodiment of control logic for determining crop population within a field during a harvesting operation being performed by an agricultural harvester in accordance with aspects of the present subject matter.

Referring now to FIG. 5, a flow diagram of one embodiment of example control logic 200 that may be executed by the computing system 110 (or any other suitable computing system) for determining crop population within a field during a harvesting operation being performed by an agricultural harvester is illustrated in accordance with aspects of the present subject matter. Specifically, the control logic 200 shown in FIG. 5 is representative of steps of one embodiment of an algorithm that can be executed to determine the crop population within a field during a harvesting operation in a manner that is accurate and does not require substantial computing resources. However, in other embodiments, the control logic 200 may be used in association with any other suitable system, application, and/or the like for determining crop population within a field during a harvesting operation being performed by an agricultural harvester.

As shown in FIG. 5, at (202), the control logic 200 includes receiving image data depicting harvested material entering or being conveyed through a feeder of an agricultural harvester during a harvesting operation. Specifically, as mentioned above, in several embodiments, the computing system 110 may be communicatively coupled to the imaging device 102 via the communicative link 112. In this respect, as the agricultural harvester 10 travels across the field to perform a harvesting operation thereon, the computing system 110 may receive data from the imaging device 102. Such data may, in turn, depict the harvested material entering or being conveyed through the feeder 42 of the agricultural harvester 10.

Furthermore, at (204), the control logic 200 includes analyzing the received image data to identify crop ears present within the harvested material entering or being conveyed through the feeder. Specifically, in several embodiments, the computing system 110 may be configured to analyze the image data received at (202) to identify crop ears present within the harvested material entering or being conveyed through the feeder 42 of the harvester 10. In this respect, the computing system 110 may use any suitable image processing techniques to identify the crop ears within the harvested material. For example, in one embodiment, the computing system 110 may use a gradient-based image segmentation or edge detection technique, such as a Canny edge detector, a Sobel filter, and/or the like.

As used herein, the term "crop ear" refers to the grain-bearing tip portion of the stem of a crop. For example, the grain-bearing tip portions of corn (e.g., the corn ears), wheat, maize, barley, rye, and the like constitute crop ears. Moreover, a bean pod constitutes a crop ear.

Additionally, at (206), the control logic 200 includes determining the crop population within at least a portion of the field based on the identified crop ears present within the harvested material. Specifically, in several embodiments, the computing system is configured to determine the crop population within at least a portion of the field based on the crop ears that were identified within the harvested material at (204). For example, the computing system 110 may determine count or otherwise determine the number of crop ears entering or being conveyed through the feeder 42 that were identified at (204). In many instances, crop plants include a single crop ear (e.g., each corn plant generally includes one corn ear). In such instances, the number of identified crop ears entering or being conveyed through the feeder 42 for a given portion of the field that is determined at (206) corresponds to the crop population for the given portion of the field. In other instances, crop plants, such as beans, may include multiple ears or pods. Thus, in such instances, the crop population for a given portion of the field may correspond to the number of identified crop ears entering or being conveyed through the feeder 42 for the given portion of the field that is determined at (206) divided by the typical number of ears or pods present on such plants.

Moreover, at (208), the control logic 200 includes accessing planting data indicative of the number of seeds planted within the at least the portion of the field. Specifically, in several embodiments, the computing system 110 is configured to access planting data, such as from its memory device(s) 116 or a remote computing device(s) (e.g., a remote database server). The accessed planted data is, in turn, indicative of the number of seeds planted the field (or a portion thereof).

In addition, at (210), the control logic 200 includes determining the difference between the determined crop population within the at least the portion of the field and the number of seeds planted within the at least the portion of the field. Specifically, in several embodiments, the computing system 110 is configured to compare the crop population determined at (206) and the number of seeds planted accessed at (208) to determine the difference therebetween. This difference, in turn, provides an indication of how many or what portion of the seeds that were planted within the field (or a portion thereof) resulted in plants that produced harvestable crop (e.g., the crop ears). For example, if 30,000 seeds are planted in a given acre of the field and only 25,000 corn plants are identified in the given acre of the field, the difference determined at (210) would be 5,000. This difference may, in turn, provide an indication of the effectiveness of the previous planting operation (e.g., the suitability of the seed type planted within the field).

As shown in FIG. 5, at (212), the control logic 200 includes determining a yield parameter for the at least the portion of the field based on the determined difference. Specifically, in several embodiments, the computing system 110 may be configured to determine one or more yield parameters for the field (or a portion thereof) based on the difference determined at (210). For example, such yield parameter(s) may include the average yield per plant, the estimated profit per one thousand plants per acre, and/or the like.

Furthermore, at (214), the control logic 200 includes generating a field map depicting the determined crop population at one or more locations within the at least the portion of the field based on the location data. Specifically, as mentioned above, in several embodiments, the computing system 110 may be communicatively coupled to the location sensor 106 via the communicative link 112. In this respect, as the agricultural harvester 10 travels across the field to perform the harvesting operation, the computing system 110 may receive location data from the location sensor 106. Such data may, in turn, provide an indication of the location of the harvester 10 within the field. As such, the computing system 110 may correlate each determination of crop population for a portion of the field to a location within the within (e.g., based on time stamps associated with the crop population determination and the location data). Thereafter, the computing system 110 may generate a field map depicting the determined crop population at one or more locations within the field (or a portion thereof).

Additionally, at (216), the control logic 200 includes initiating notification of the determined crop population to an operator of the agricultural harvester. Specifically, in several embodiments, the computing system 110 may be configured to initiate notification of the crop population determined at (206) to an operator of the agricultural harvester. In addition, at (206), the computing system 110 may be configured to initiate notification of the number of seed planted as accessed at (208), the difference between the crop population and the number seeds planted determined at (210), the yield-based parameter(s) determined at (212), and/or the field map generated at (214). For example, the computing system 110 may transmit feedback signals to the user interface 118 via the communicative link 112. Such feedback signals, in turn, instruct the user interface 118 to provide a visual and/or audible notification associated the crop population, the number of seed planted, the difference between the crop population and the number seeds planted, the yield-based parameter(s), and/or the field map.

Moreover, at (218), the control logic 200 includes controlling the ground speed of the agricultural harvester based on the determined crop population. Specifically, in several embodiments, the computing system 110 is configured to control the ground speed of the agricultural harvester 10 based on the crop population determined at (206) and other parameters, such as grain loss, driveline loads, engine load, etc. Thus, in general, the ground speed of the agricultural harvester 10 determined at (206) may be one of many parameters that are used to collectively control the ground speed of the agricultural harvester 10. For example, when the crop population is high (e.g., exceeds a predetermined maximum threshold) and other parameters are outside of specified ranges, the computing system 110 may initiate a reduction in the ground speed of the agricultural harvester 10 to allow the harvester 10 to process the increased number of crop plants present within the field. Conversely, when the crop population is low (e.g., exceeds a predetermined minimum threshold) and other parameters are outside of specified ranges, the computing system 110 may initiate an increase in the ground speed of the agricultural harvester 10 to increase harvest efficiency. Thus, the computing system 110 may transmit control signals to the engine 38, the transmission 40, and/or the braking actuator(s) 108 via the communicative link 112. The control signals, in turn, instruct the engine 38, the transmission 40, and/or the braking actuator(s) 108 to operate in a manner that adjusts the speed of the harvester 10.

Referring now to FIG. 6, a flow diagram of one embodiment of a method 300 for determining crop population within a field during a harvesting operation being performed by an agricultural harvester is illustrated in accordance with aspects of the present subject matter. In general, the method 300 will be described herein with reference to the agricultural harvester 10 and the system 100 described above with reference to FIGS. 1-5. However, it should be appreciated by those of ordinary skill in the art that the disclosed method 300 may generally be implemented with any agricultural harvester having any suitable harvester configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, image data depicting harvested material entering or being conveyed through a feeder of an agricultural harvester during a harvesting operation. For instance, as described above, the computing system 110 may be configured to receive image data from the imaging device 102. Such image data, in turn, depicts harvested material entering or being conveyed through the feeder 42 of the during a harvesting operation.

Furthermore, at (304), the method 300 includes analyzing, with the computing system, the received image data to identify crop ears present within the harvested material entering or being conveyed through the feeder. For instance, as described above, the computing system 110 may be configured to analyze the received image data to identify crop ears present within the harvested material entering or being conveyed through the feeder 42.

Additionally, at (306), the method 300 includes determining, with computing system, a crop population within at least a portion of the field based on the identified crop ears present within the harvested material. For instance, as described above, the computing system 110 may be configured to determine the crop population within at least a portion of the field based on the identified crop ears present within the harvested material.

Moreover, at (308), the method 300 includes controlling, with computing system, the ground speed of the agricultural harvester based on the determined crop population. For instance, as described above, the computing system 110 may be configured to control the ground speed of the agricultural harvester based on the determined crop population (e.g., by controlling the operation of the engine 38, the transmission 40, and/or the braking actuator(s) 108).

It is to be understood that the steps of the control logic 200 and the method 300 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the control logic 200 and the method 300, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural harvester, comprising:
   a frame;
   a threshing and separating assembly supported on the frame;
   a feeder adjustably coupled to the frame to convey harvested material from a harvesting implement to the threshing and separating assembly;
   an imaging device positioned within the feeder, wherein the imaging device generates image data depicting the harvested material entering or being conveyed through the feeder during the harvesting operation; and
   a computing system communicatively coupled to the imaging device, wherein the computing system:
   analyzes the generated image data to identify crop ears present within the harvested material entering or being conveyed through the feeder;
   determines a crop population within at least a portion of the field based on the identified crop ears present within the harvested material; and
   controls a ground speed of the agricultural harvester based on the determined crop population.

2. The agricultural harvester of claim 1, wherein, when determining the crop population, the computing system determines a number of the identified crop ears entering or being conveyed through the feeder such that the determined number corresponds to the determined crop population.

3. The agricultural harvester of claim 1, wherein the computing system initiates notification of the determined crop population to an operator of the agricultural harvester.

4. The agricultural harvester of claim 1, wherein the computing system:

accesses planting data indicative of a number of seeds planted within the at least the portion of the field; and determines a difference between the determined crop population within the at least the portion of the field and the number of seeds planted within the at least the portion of the field.

5. A system for determining crop population within a field during a harvesting operation being performed by an agricultural harvester, the system comprising:

a feeder that conveys harvested material from a harvesting implement of the agricultural harvester to a threshing and separating assembly of the agricultural harvester;

an imaging device that generates image data depicting the harvested material entering or being conveyed through the feeder during the harvesting operation; and a computing system communicatively coupled to the imaging device, wherein the computing system:

analyzes the generated image data to identify crop ears present within the harvested material entering or being conveyed through the feeder;

determines a crop population within at least a portion of the field based on the identified crop ears present within the harvested material; and controls a ground speed of the agricultural harvester based on the determined crop population.

6. The system of claim 5, wherein, when determining the crop population, the computing system determines a number of the identified crop ears entering or being conveyed through the feeder such that the determined number corresponds to the determined crop population.

7. The system of claim 5, wherein the computing system initiates notification of the determined crop population to an operator of the agricultural harvester.

8. The system of claim 5, wherein the computing system:

accesses planting data indicative of a number of seeds planted within the at least the portion of the field; and determines a difference between the determined crop population within the at least the portion of the field and the number of seeds planted within the at least the portion of the field.

9. The system of claim 8, wherein the computing system determines a yield parameter for the at least the portion of the field based on the determined difference.

10. The system of claim 5, further comprising:

a location sensor that generates location data indicative of a position of the agricultural harvester within the field, the location sensor being communicatively coupled to the computing system, wherein the computing system generates a field map depicting the determined crop population at one or more locations within the at least the portion of the field based on the location data.

11. The system of claim 5, wherein the imaging device is positioned within the feeder such that the imaging device has a field of view directed at the harvested material being conveyed through the feeder.

12. The system of claim 5, further comprising:

a harvesting implement coupled to the feeder, the imaging device being mounted on the harvesting implement such that the imaging device has a field of view directed at the harvested material entering the feeder.

13. The system of claim 5, wherein the imaging device comprises a camera.

14. A method for determining crop population within a field during a harvesting operation being performed by an agricultural harvester, the agricultural harvester including a feeder that conveys harvested material from a harvesting implement of the agricultural harvester to a threshing and separating assembly of the agricultural harvester, the method comprising:

receiving, with a computing system, image data depicting the harvested material entering or being conveyed through the feeder during the harvesting operation;

analyzing, with the computing system, the received image data to identify crop ears present within the harvested material entering or being conveyed through the feeder;

determining, with the computing system, a crop population within at least a portion of the field based on the identified crop ears present within the harvested material; and controlling, with the computing system, a ground speed of the agricultural harvester based on the determined crop population.

15. The method of claim 14, wherein determining the crop population comprises determining, with the computing system, a number of the identified crop ears entering or being conveyed through the feeder such that the determined number corresponds to the determined crop population.

16. The method of claim 14, further comprising:

initiating, with the computing system, notification of the determined crop population to an operator of the agricultural harvester.

17. The method of claim 14, further comprising:

accessing, with the computing system, planting data indicative of a number of seeds planted within the at least the portion of the field; and determining, with the computing system, a difference between the determined crop population within the at least the portion of the field and the number of seeds planted within the at least the portion of the field.

18. The method of claim 14, further comprising:

determining, with the computing system, a yield parameter for the at least the portion of the field based on the determined difference.

* * * * *